United States Patent
Milazzo

(10) Patent No.: US 9,141,957 B2
(45) Date of Patent: Sep. 22, 2015

(54) SYSTEM AND METHOD FOR FILTERING ADVERTISING IN A NETWORKING DEVICE

(75) Inventor: Cedar Milazzo, San Jose, CA (US)

(73) Assignee: Netgear, Inc., San Jose, CA (US)

( * ) Notice: Subject to any disclaimer, the term of this patent is extended or adjusted under 35 U.S.C. 154(b) by 0 days.

(21) Appl. No.: 13/444,245

(22) Filed: Apr. 11, 2012

(65) Prior Publication Data

US 2013/0275228 A1     Oct. 17, 2013

(51) Int. Cl.
*G06Q 30/00*     (2012.01)
*G06Q 30/02*     (2012.01)

(52) U.S. Cl.
CPC ............ *G06Q 30/00* (2013.01); *G06Q 30/0269* (2013.01)

(58) Field of Classification Search
USPC ..................................................... 705/14.66
See application file for complete search history.

(56) References Cited

U.S. PATENT DOCUMENTS

| | | | |
|---|---|---|---|
| 2008/0082402 A1* | 4/2008 | Turrentine | 705/14 |
| 2008/0244076 A1* | 10/2008 | Shah et al. | 709/227 |
| 2009/0055267 A1* | 2/2009 | Roker | 705/14 |
| 2010/0124907 A1* | 5/2010 | Hull et al. | 455/412.1 |
| 2010/0138488 A1* | 6/2010 | Fletcher et al. | 709/203 |
| 2010/0318423 A1* | 12/2010 | Kanigsberg et al. | 705/14.53 |
| 2011/0238495 A1* | 9/2011 | Kang | 705/14.49 |
| 2011/0258049 A1* | 10/2011 | Ramer et al. | 705/14.66 |
| 2012/0078725 A1* | 3/2012 | Maitra et al. | 705/14.66 |
| 2012/0143673 A1* | 6/2012 | Law et al. | 705/14.42 |
| 2012/0173315 A1* | 7/2012 | Martini et al. | 705/14.4 |

\* cited by examiner

*Primary Examiner* — Sujay Koneru
(74) *Attorney, Agent, or Firm* — Boyle Fredrickson, S.C.

(57) ABSTRACT

A network appliance configured to optimize advertising content displayed on an internal network. The appliance includes a network appliance input connected at least indirectly to an internal network and configured to receive a plurality of data packets including a request for advertising content, a data packet analyzer configured to monitor the plurality of data packets and to detect the request for advertising content, an advertisement profile generator configured to generate a user profile and to modify the request for advertising content based on the user profile, and a network appliance output connected at least indirectly to an external network and configured to transmit the plurality of data packets including the modified request for advertising content.

10 Claims, 3 Drawing Sheets

SYSTEM AND METHOD FOR FILTERING ADVERTISING IN A NETWORKING DEVICE

CROSS-REFERENCE TO RELATED APPLICATIONS

None.

FIELD OF INVENTION

This invention generally relates to the field of filtering information in a computer network appliance and more particularly to a system and method for modifying an advertising request in a network appliance to obtain a customized advertisement.

BACKGROUND OF THE INVENTION

Internet browsing and other online activities have become increasingly important in users' lives as they obtain information, access entertainment, play games, listen to downloaded audio, etc. The individual personal computer users downloading of information accounts for 93.5% of Internet use.

Advertisers are keenly aware of the amount of time users spend on the Internet and are including their advertising materials alongside the information that is downloaded to user's computers, tablets, cell phones, game consoles, or other devices. Providing these advertising materials is an increasingly popular business model. Advertising revenue is an increasingly important revenue stream for content providers. For example, one online search engine provider estimated that 83% of its web revenue is earned by displaying advertising alongside content.

As advertisers are recognizing the value of providing advertising with downloaded content, they are also continuously striving to improve the effectiveness of such advertising. Effective advertising is generally providing by customizing the subject matter being advertised to the viewer. Increasing the effectiveness of the advertising can be valuable both to the advertiser and to the content provider that is providing the advertisement. For example, advertisers are known to pay a small amount based upon each display of the advertisement and to pay a significantly higher amount to content providers when users actually click on the displayed advertisements.

Accordingly, both advertisers and content providers have taken steps to match downloaded advertisements to the users that will be viewing those advertisements, increasing the likelihood that the user will click on the advertisement. Advertisers gather as much information as possible about users including, for example, the types of websites they typically visit, search terms entered by the user, types of applications installed on the user's computer system, etc. Advertisers use this information to target specific content alongside which their advertising materials are to be downloaded. For example, users viewing downloaded content related to the stock market will be presented with advertisements from brokerage companies.

However, user activity and content subject matter will not always provide the best indication of the type of advertising materials that are of interest to the user. For example, although some users may typically visit financial services sites to obtain information, they may prefer to spend their money pursuing a hobby unrelated to their online activities. Content providers that provide advertisements that are uninteresting to the user will not only decrease their own revenue, but also risk alienating the user.

What is needed is a system and method for filtering advertisements that is customized to an individual network. What is further needed is such a system and method that may be customized by users on the network to optimize the types of advertisements that are displayed.

SUMMARY

According to one embodiment of the invention, a network appliance configured to optimize advertising content displayed on an internal network is described. The appliance includes a network appliance input connected at least indirectly to an internal network and configured to receive a plurality of data packets including a request for advertising content, a data packet analyzer configured to monitor the plurality of data packets to detect the request for advertising content, an advertisement profile generator configured to generate a user profile and modify the request for advertising content based on the user profile, and a network appliance output connected at least indirectly to an external network and configured to transmit the plurality of data packets including the modified request for advertising content.

In one embodiment, the network appliance is one of a router, a gateway device and a switch. In another embodiment, modifying the request for advertising content based on the user profile includes inserting keywords into the request and increasing a keyword count for the additional keywords included in the request.

The process of generating a user profile can include determining an activity type that can be associated with information in a payload of the data packets, identifying at least one keyword that can be associated with the activity type, and including the keyword in the advertising content profile. The user profile can further be updated by incrementing a weighting counter associated with a keyword upon determining that the keyword is in the advertising content profile.

According to one embodiment of the invention, a computer-implemented method implemented by a network appliance to optimize advertising content displayed on one or more devices in an internal network is described. The method includes the steps of receiving a plurality of data packets including a request for advertising content from the one or more devices in an internal network, monitoring the plurality of data packets to detect a request for advertising content, modifying the request for advertising content based on a user profile, and transmitting the plurality of data packets including the modified request for advertising content to an external network.

According to another embodiment of the invention, a network appliance configured to coordinate the provision of advertising content across multiple devices on an internal network. The network appliance includes a network appliance input connected at least indirectly to an internal network and configured to receive a plurality of data packets including a request for advertising content, a data packet analyzer configured to monitor the plurality of data packets to detect the request for advertising content, an advertisement server configured to identify at least two devices on the internal network to contemporaneously receive the advertisement and to modify the request for advertising content based on the identification, and a network appliance output connected at least indirectly to an external network and configured to transmit the plurality of data packets including the modified request for advertising content.

Other features and advantages of the invention will become apparent to those skilled in the art upon review of the follow-

Figure 1:
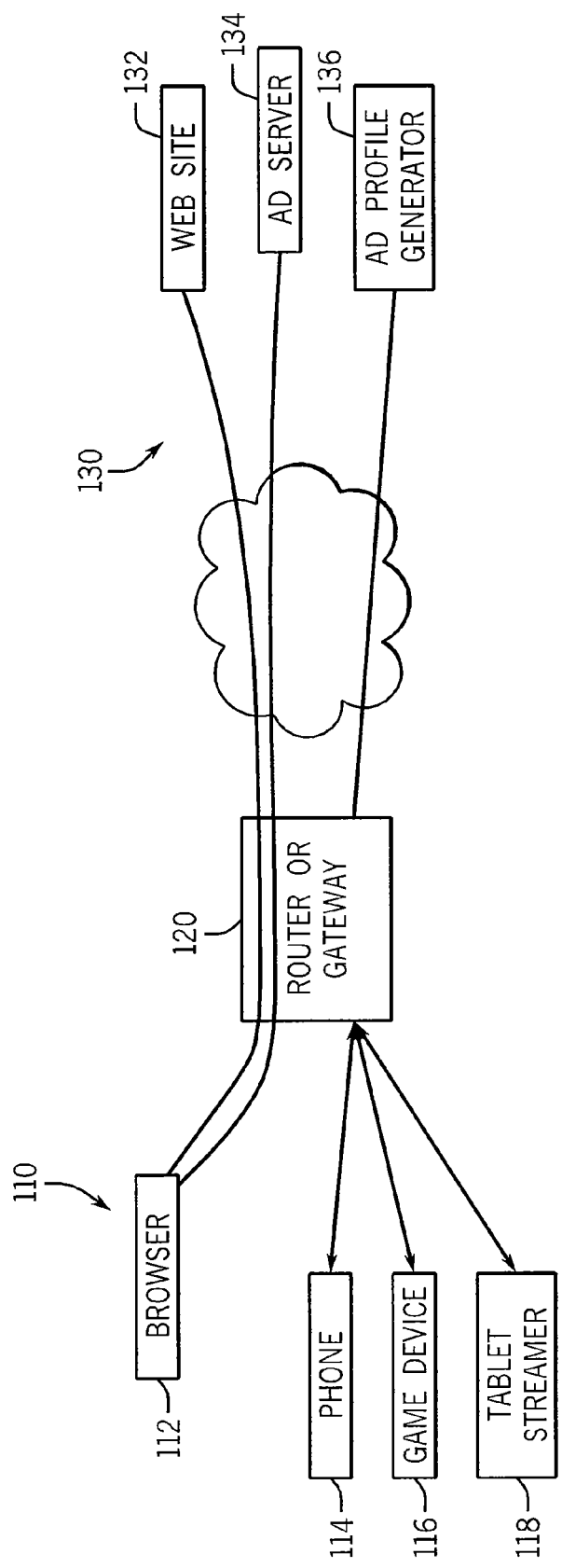
FIG. 1 schematically illustrates a networking environment for communicating information including optimized advertising content between an internal network and an external network through a network appliance, according to an exemplary embodiment.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Referring now to FIG. 1, a networking environment 100 for communicating information between an internal network 110 and an external network 130 through a network appliance 120 is shown, according to an exemplary embodiment. The information includes requests for advertisements originating from the internal network and advertisements received from the external network include advertising content based on a request transmitted from the internal network.

Internal network 110 is a local area network configured to provide communication of information with a plurality of devices and applications in relatively close proximity to each other, such as within a home, school, office building, etc. Internal network 110 includes a web browser 112 running on a personal computing device such as a desktop computer, a laptop computer, a tablet, etc, a smartphone 114, a game device 116, and a streaming media player 118. It should be understood that although FIG. 1 show specific devices and applications, these are merely provided as examples. Internal network 110 may include a single device in communication with network appliance 120. Any or all of these or other devices could be present in a given internal network. Internal network 110 may further include one or more additional network communication devices to provide intercommunication between devices on the network and communication with network appliance 120.

Communication to, from, and between the devices on internal network 110 is provided by the network appliance 120. The link between devices 112-118 and network appliance 120 may be a wired network, such as Ethernet, or a wireless network, such as Wi-Fi. Devices 112-118 may also be configured for intercommunication, for example using the Bluetooth communication protocol.

Network appliance 120 may be any device configured to manage the flow of data between internal network 110 and external network 130, such as a router, a switch, or a gateway. Functionality described herein as being associated with network appliance may be implemented using one or more devices. For example, network appliance 120 may be configured to include a router in communication with a network switch, either of which can be configured to perform some or all of the functions described herein. Network appliance 120 may further be implemented using a plurality of network devices in communication with each other, such as a wireless access point in communication with a gateway router.

Network appliance 120 is configured to forward data packets between the two computer networks. Data packets can include any type of bundled data transmitted between devices. Where network appliance 120 is a router, when a data packet is received from either internal network 110 or external network 130, appliance (router) 120 reads address information in the packet to determine their ultimate destination. In a packet-switched network, a "router" is a device which receives packets on one or more input interfaces and which outputs those packets on one of a plurality of output interfaces so as to move those packets within the network from a source device to a destination device. Each packet includes header information, which indicates the destination device in either internal network 110 or external network 130. The router includes routing information, which associates an output interface with information about the destination device, such as one or more of the devices 112-118. The router can also perform other operations on packets, such as rewriting the packets' headers according to their routing protocol, or re-encapsulating the packets from a first routing protocol to a second routing protocol. A router may further be configured to monitor the information being transported, such as to detect a request for advertising content.

Network appliance 120 may be a gateway device that is the exclusive communication channel between internal network 110 and external network 130. Accordingly, all content provided to or from the internal network 110, including advertising content requests, can be viewed using the network appliance 120.

External network 130 may be a wide area telecommunication network covering a broad area, such as the Internet. External network 130 may be connected to network appliance 120 using a wired or wireless connection. For example, a router network appliance 120 may be connected to a high-bandwidth connection such as a cable modem, a Digital Subscriber Line (DSL) modem, or an Integrated Services Digital Network (ISDN) connection to send and receive data with systems through external network 130.

External network 130 includes a plurality of external systems including, for example a web site 132, an advertising server 134, and an advertisement profile generator 136. These systems and applications may be accessible using an Internet Protocol address provided by any of the devices 112-118 and used by network appliance 120 to determine a destination for data, such as a request for advertising content, transmitted from internal network 110 to external network 130.

In operation, users of devices 112-118 will exchange data with system associated with external network 130. These data exchanges can include requests for information, such as Internet browsing, or data exchanges, such as online gaming, etc. The data exchanges can include advertising content that can be recognized by network appliance 120. It is important to recognize that the form of the advertising content can be highly variable and still be recognized by the appliance 120. Advertising content can include a request for advertising generated by an http cookie. One example of such a request is information that is used by an origin website 132 to send its own request to a user's browser 112 for the browser 112 to return the state information to the origin site. The state information can be used for authentication, identification of a user session, user's preferences, shopping cart contents, or anything else that can be accomplished through storing text data on the user's computer. The advertising content can include actual advertisements to be displayed or otherwise provided to a user. Examples include an advertisement to be displayed in browser 112, an advertisement to be displayed within a game on game device 116, and/or an advertisement embedded in audio content to be played through one or more devices 112-118.

Network appliance 120 is configured to recognize advertising content transmitted between internal network 110 and external network 130. Network appliance is further configured to optimize the advertising content that is provided to users of internal network 110. Optimizing advertising content can include providing customized keywords, modifying information communicated to advertising content providers, requesting advertising content from specific providers, etc. as described in further detail below.

Figure 2:
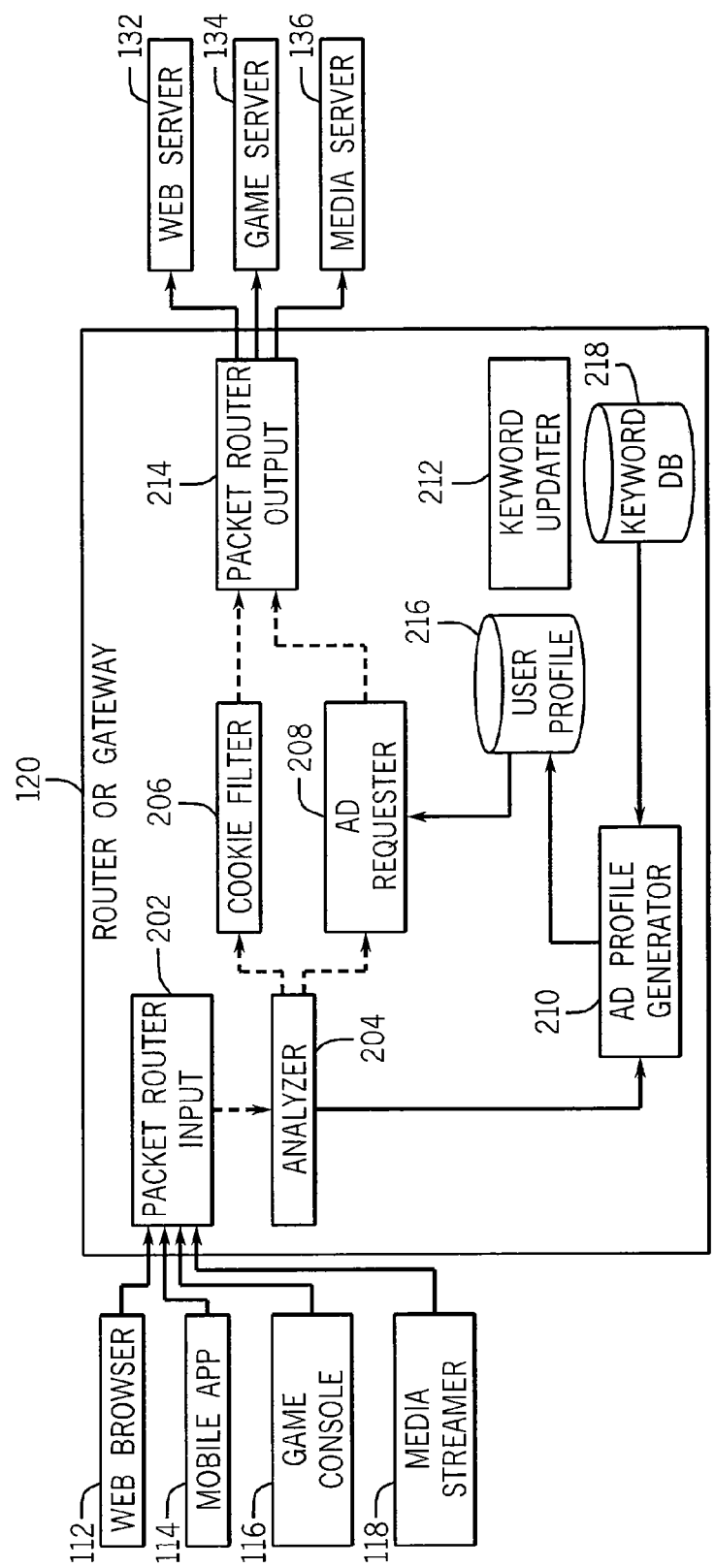
FIG. 2 illustrates an embodiment of the network appliance of FIG. 1 shown in greater detail.

Referring now to FIG. 2, network appliance 120 is shown in greater detail, according to an exemplary embodiment. Although appliance 120 is shown in FIG. 2 as including specific components in an exemplary configuration, it is important to recognize that appliance 120 may include more, fewer, and/or a different configuration of components to implement the functions described herein.

The functional components of network appliance 120 may be implemented using hardware including a processing unit, a system memory, and a system bus that couples various system components, including the system memory, to the processing unit. The system bus may be any of several types of bus structures including a memory bus or memory controller, a peripheral bus, and a local bus using any of a variety of bus architectures. Further, the described components may be implemented using hardware and/or software.

The processing unit may be any type of computer processor configured to implement the functionality described herein including the steps of identifying advertising content requests in network packets transmitted through appliance 120. The processing unit may be a MIPS processor in a preferred embodiment.

The system memory includes computer storage media in the form of volatile and/or nonvolatile memory such as read only memory (ROM) and random access memory (RAM). A basic input/output system (BIOS), containing the basic routines that help to transfer information between elements within appliance 120, such as during start-up or networking operations, is typically stored in ROM. RAM typically contains data and/or program modules that are immediately accessible to and/or presently being operated on by the processing unit. The appliance 120 may also include other removable/non-removable, volatile/nonvolatile computer storage media, such as flash memory.

Although network appliance 120 may be any of a variety of types of network appliances, for clarity appliance 120 is further described herein with reference to a router type network appliance. Appliance 120 includes a packet router input 202, an analyzer 204, a cookie filter 206, an advertisement requestor 208, an advertisement profile generator 210, a keyword updater 212, and a packet router output 214. Appliance 120 further includes a user profile 216 and a keyword database 218 stored in local memory.

Packet router input 202 is an input port receiving data packets from the internal network 110. Router input 202 may be an Ethernet port, a wireless receiver, or another device receiving network information from network 110.

Analyzer 204 is a software component configured to determine whether packets received from packet router input 202 contains any of a cookie request, an advertisement request, information indicative of user activities that can be use to update user profile 216, or none of the above. Where analyzer 204 determines that a received packet contains none of the above, the packet is provided directly to packet router output 214.

Cookie filter 206 receives packets identified by analyzer 204 to contain a cookie request. Cookie filter 206 receives all cookies "set" requests, messages sent by ad server 134 in response to an HTTP request from a device on network 110, which is used to create a cookie on the device, and determines whether the received packet includes a tracking cookie or a short term session cookie. A tracking cookie can provide detailed information regarding user activity while a session cookie only lasts for the duration of users' use of a website providing the cookie. A web browser normally deletes session cookies. Cookie filter 206 may be configurable by the user as described below with reference to FIG. 3. Based on configuration, cookie filter can either block or allow the cookie to be set, different types of cookies, etc. Cookies that are allowed to pass through filter 206 are set via the HTTP "Set-Cookie: name=value" header.

Cookie names and patterns are constantly changing to improve their usefulness to users, adapt to new technology patterns, circumvent spam filters, etc. Accordingly, cookie filter 206 is further configured to generate messages transmitted through packet router output 214 to periodically retrieve the name and patterns of commonly used tracking cookies. The list may be retrieved from a website 132, advertisement profile generator 136, or any other recognized information source and stored in local memory.

Advertisement requester 208 receives packets identified by analyzer 204 to contain requests for advertisements. In response, advertisement requestor 208 retrieves user profile information from user profile 216 and compares the retrieved profile information to keyword information in keyword database 218. If the retrieved profile information suggests additional keywords as described below in detail with reference to FIG. 3, these keywords are identified. Based on the comparison, requester 208 formats a request to advertisement server 134 including the identified keywords.

Advertisement requests received by advertisement requester 208 are formatted based on advertising content provider specifications. For example, different advertising content provider advertisement request contain different number of keywords, different message formats, monitor different user activities, etc. Accordingly, advertisement requester 208 is configured to generate outgoing advertisement requests based on the format of the received advertisement request. Alternatively, advertisement requester 208 may be configured to format outgoing advertisement requests based on a target advertisement server 134 format. In one exemplary embodiment, advertisement requester 208 may be configured to retransmit received advertisement requests including additional keywords added from database 218 to optimize the types of advertisements provided by advertisement server 134.

Advertisement profile generator 210 receives packets identified by analyzer 204 to contain information indicative of user activities that can be used to update user profile 216. For each session initiating communication between a device on internal network 110 and external network 130, advertisement profile generator 210 can analyze packet header information. The packet header information can classify the received header information into one of a defined set of user activity categories. Table I provides an illustrative example of user activities and an activity type that may be associated with each user activity.

TABLE I

| |
|---|
| Art/Photo/Music Art - Music - Photo |
| Automotive Cars & Trucks - Motorcycles - Parts & Accessories - Rentals - Tools and Supplies |
| Beauty Bath & Body - Cosmetics - Fragrance |
| Books/Media Audio Books - Books - Magazines - News - Television - Videos/Movies |
| Business Business-to-Business - Marketing - Office - Productivity Tools - Travel |
| Buying and Selling Auction - Classifieds - E-commerce Solutions/Providers - New/Used Goods |
| Careers Employment - Military |
| Clothing/Apparel Children's - Malls - Men's - Women's |
| Computer & Electronics Computer HW - Computer Support - Computer SW - Consumer Electronics - Peripherals |
| Department Stores/Malls Department Stores - Virtual Malls |
| Education Children - College - Languages - Professional |
| Entertainment Discounts - Events - Guides - Memorabilia - Mobile Entertainment - Party Goods |
| Environmental Ecology - Green Attitudes - Health & Safety - World Environment |
| Family Babies - Children - Entertainment - Teens - Weddings |
| Financial Services Banking/Trading - Credit Cards - Credit Reporting and Repair - Investment - Mortgage Loans - Personal Loans - Real Estate Services - Tax Services |
| Food & Drinks Gourmet - Groceries - Restaurants - Wine & Spirits |
| Games & Toys Electronic Games - Electronic Toys - Games - Toys |

Appliance 120 may be configured to recognize keywords, web addresses, etc. associated with the specific activities associate activities with a broader category to create a condensed set of user activities. The condensed set of user activities is stored in the user profile database 216.

Keyword updater 212 is configured to periodically contact a system on external network 130 to retrieve a new set of keywords to be used in combination with the profile information. The retrieved keywords and profile information can be used to generate advertisement requests in advertisement requester 208.

Packet router output 214 is an output port transmitting data packets to the external network 130. Router output 214 can be an Ethernet port, a wireless transmitter, or another device for transmitting network information to network 130.

User profile database 216 is configured to include a user profile to be associated with one or all of the devices on internal network 110. A user profile consists of a set of keywords and a counter providing a weighting for each of the keywords in the set of keywords. The weighting can be used to determine the frequency with which the keyword is to be included in advertisement requests, the ordering of keywords provided in advertising requests, etc. Alternatively, the weighting can be provided directly in the advertisement request. The profile further includes a second counter associated with each keyword indicating the number of times that the keyword has been provided in advertisement requests transmitted to external network 130.

Figure 3:
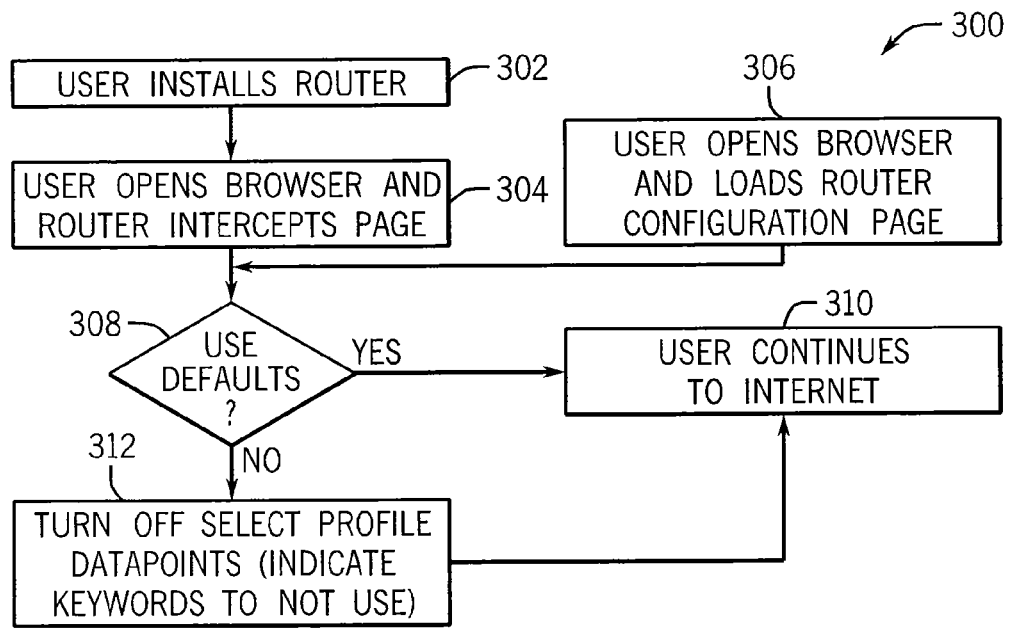
FIG. 3 is a flowchart a method for configuring a network appliance profile database for use in optimizing advertising content, according to an exemplary embodiment.

The content of user profile database 216 preferably is configurable by a user of a device on internal network 110. The profile may be configured during an initial configuration of the network appliance 120 and/or during ongoing use. Referring now also to FIG. 3, a flowchart 300 illustrating a method for configuring a network appliance profile database for use in optimize advertising content is shown, according to an exemplary embodiment. Although flowchart 300 includes a multiple steps, performed in a defined order, the functions described herein can be performed using more, less and/or a different ordering of steps.

User profile database 216 may be configured to maintain a plurality of different user profiles associated with different users. Users may be identified by a number of different methods such as associating activities with a likely user based on user profile information, receiving user identification information from the devices 112-118 based on, for example, log in information entered into the device or an application on the device, etc. Each user profile may include a unique set of associated keywords to customize the provided advertising for that user.

In a first step 302, the user of a device on internal network 110 installs the network appliance 120 software. For example, the software may be router configuration software installed on a personal computer. In a step 304, the user can open a web browsing application on their personal computer and provider an http address associated with the network appliance 120. Network appliance 120 will receive the transmitted initiation request, recognize the address, and provide a web page to the device to initiate profile configuration.

Alternatively, during ongoing operation of the network appliance, the user may desire to customize the types of advertisements being displayed. The user may desire the change based on a new hobby, evolving interests, or simply because he or she become tired of seeing certain types of ads. In a step 306, the user can open a web browsing application on his or her personal computer and provider an http address associated with the network appliance 120. Network appliance 120 will receive the transmitted reconfiguration request, recognize the address and provide a web page to the device to initiate profile configuration.

In step 308, independent of whether the user is initially configuring or is reconfiguring the network appliance 120, network appliance 120 receives input from a user selecting either default advertisement optimization or customized advertisement optimization. Where default advertisement is selected in step 308, network appliance 120 continues normal operation at step 310, generating keywords based on the user's network activities.

When a new network appliance 120 is used with network 110, profile generator 210 requests a set of keywords and associated internet locations from advertisement profile generator 136. The received keywords are stored in the keyword database 218. The internet location can be accessed by appliance 120 using any number of protocols, such as HTTP, UDP, bare TCP/IP sockets, etc. The protocol and location are both contained in a profile associated with the location.

When a user accesses one of the know locations from a web browser 112 or other application during network 130 activities, profile generator 210 increases the weighting for the keyword associated with that location. The locations may be generic locations (such as "all HTTP web pages"), and the profile generator 210 may be configured to pattern match the HTTP pages to recognize known keywords in network 130 activities database 218, increasing the weighting associated with the recognized keywords in user profile 216.

Where customized advertisement optimization is select in step 308, a web page can be provided to the user including a listing of keywords in user profile 216 and their associated weighting information in a step 312. Network appliance 120 can receive user input modifying the keywords and/or weighting associated with keywords to customize their advertisement optimization.

Referring again to FIG. 2, during normal operation, when a user opens an application configured to include downloaded advertising content using one of the devices 112-118 on network 110, network appliance 120 is configuration to recognize and intercept an advertisement request generated by that application. Network appliance 120 can insert keywords from database 218 into the advertisement request based on keyword weighting and information in the user profile 216. Advantageously, insertion of the keywords will increase the likelihood that downloaded advertising content will be of interest to the user.

Network appliance 120 can be configured to perform more aggressive filtering of advertising requests by requiring user consent prior to providing any user profile information to external network 130. This configuration may be used in combination with the advertising customization described above to allow certain applications to provide advertising, while blocking others such as known malware applications.

Network appliance 120 can enhance the network browsing experience for users of network 110 by removing irrelevant advertisements, presenting advertisements that are relevant, and enabling control of keywords transmitted to external network 130. Network appliance 120 can further enhance user privacy by providing users with access to their advertising profile, allowing them to strip off advertising cookies, make requests to advertisement servers directly, and enable filtering the type of data being collected. For example, network appliance 120 may provide users with access to the keyword listing and/or keyword weighting allowing them to make changes to the information stored therein to optimize their advertising experience. Users can further reset their profile to restore a blank profile and/or a profile based entirely on their activities.

Providing user control over their profile can increase the delivered advertising value for both users and advertisers. Users can customize their experience such that they are more likely to received advertisements that are of interest. Users can request this information directly without providing information through, for example, tracking cookies to increase their privacy without diminishing the relevancy of the advertisements that they view. According to one exemplary embodiment, a browser application 112 can be used to display a listing of keywords, activities, groups, etc. that the user can select and/or deselect as desired. Similarly, advertisers can deliver advertisements that are more likely to result in a sale or other follow up activity by the user.

Figure 4:
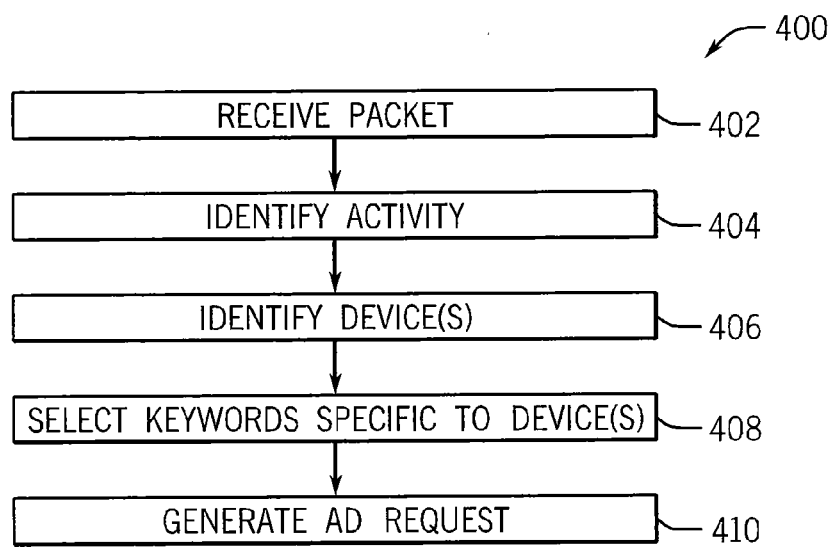
FIG. 4 is a flowchart illustrating a method for coordinating advertising specific to devices and/or across multiple devices in an internal network, according to an exemplary embodiment.

Referring now to FIG. 4, a flowchart 400 illustrating a method for coordinating advertising specific to devices and/or across multiple devices in internal network 110 is shown. The method of flowchart 400 may be implemented by a router or other network appliance 120 having detailed information regarding the devices on internal network 110. This information may include device type, device configuration, device specifications, etc. This information may be provided by a user during a configuration process or may be determined based on communication between the network appliance 120 and the device, such as by using a device MAC address.

In a step 402, network appliance 120 receives a data packet including an informational header. The payload of the data packet can be used in a step 404 to determine one or more activities being performed using the device. It is important to recognize that network appliance 120 often will provide network management services to a number of different devices that are being used simultaneously. Examples of multiple activities can include listening to an audio stream on a device 118 while browsing the Internet using a web browsing application 112.

In addition to destination information, the informational header includes source information. Network appliance 120 can be used to identify the type of device originating the advertisement in a step 406. The device can be identified, for example, using a device lookup table correlating a device type with an internal network identifier for each device, such as a MAC address. Based on this information, appliance 120 can detect the simultaneous use of multiple devices and the activities being performed on those devices.

In a step 408, appliance 120 can include information in the advertisement request indicating the type of device that will be used to provide the advertisement that is returned based on the advertisement request. Accordingly, an advertisement server 134 can provide an advertisement that is customized to the particular device. For example, for a smartphone device having a relatively smaller display, advertisement server 134 may provide a relatively simple advertisement.

Similarly, appliance 120 can provide information in the advertisement request indicating the concurrent use of multiple devices and the type of the devices. Advertisement server 134 can be configured to provide an advertisement intended for simultaneous display across multiple devices. Because appliance 120 is coordinating both the advertisement request and the returned advertisement, network appliance 120 can be used to ensure that the advertisement is provided simultaneous to the devices. In an exemplary embodiment, appliance 120 further includes an advertisement request generator configured to modify the request or generate a new request for a multi-device advertisement. For example, an audio stream advertisement can be provided contemporaneously on the device 118 with a banner advertisement displayed in the web browser 112.

The generated advertisement request including device identification information can be transmitted to advertisement server 134 in a step 410. Network appliance 120 may further be used to coordinate receiving the response and transmitting the advertisements to the appropriate devices simultaneously.

Certain terminology is used herein for purposes of reference only, and thus is not intended to be limiting. For example, terms such as "network device" refer to any system receiving and retransmitting information packets in a computer network.

References to "a server" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. It should be understood that a computer program may embrace constituent programs and that multiple programs may be implemented as a single or multiple programs.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A gateway router configured to optimize advertising content displayed on an internal network, comprising:
   a network appliance input connected through one of a wired network port and a wireless transceiver to an internal network and configured to receive a plurality of data packets including a request for advertising content generated by a first application executed by a first computing system communicating with the network appliance through the internal network, wherein the packets are being transmitted to a second computing system on an external network, but are being routed through the network appliance;
   a network appliance processing unit configured to identify routing information in a header of the data packets indicating that the plurality of data packets are addressed to a computing system on the external network and, based on this determination, to
      route the plurality of data packets from the first computing system on the internal network to the second computing system on the external network, and
      execute instructions stored in a non-transient system memory of network appliance to implement,
   a data packet analyzer configured to monitor the plurality of data packets to detect the request for advertising content and
   an advertisement profile generator configured to generate a user profile and modify the request for advertising content based on the user profile; and
   a network appliance output connected through a wired network port and a wireless transceiver to the external network and configured to transmit the plurality of data packets including the modified request for advertising content to a second application executed by the second computing system configured to respond to the modified request for advertising content and communicating with the network appliance through the external network,
   wherein generating a user profile includes determining an activity type that can be associated with information in a payload of the data packets, such that the activity type is based on activities of a user using the first application on the first computing system, and identifying at least one keyword that can be associated with the activity type and including the keyword in the advertising content profile and incrementing a weighting counter associated with the keyword.

2. The appliance of claim 1, wherein the network appliance is at least one of a router, a gateway device, an access point and a switch.

3. The appliance of claim 1, wherein modifying the request for advertising content based on the user profile includes inserting keywords into the request.

4. The appliance of claim 3, further including increasing a keyword count for the inserted keywords included in the request.

5. The appliance of claim 1, wherein the network appliance is configured to provide a user interface allowing a user to configure the user profile.

6. A computer-implemented method implemented by a gateway router to optimize advertising content displayed on one or more devices in an internal network, comprising
   receiving, at a network device processor, a plurality of data packets including a request for advertising content through at least one of a wired network port and a wireless transceiver of the network device from the one or more devices in an internal network, the request generated by a first application executed by at least one of the one or more devices communicating with the network appliance through the internal network, wherein the packets are being transmitted to an external computing system on an external network, but are being routed through the network appliance;
   monitoring the plurality of data packets to identify external packets addressed to a computing system on the external network and analyzing the external packets to detect a request for advertising content based on instructions stored in a non-transient system memos of the network appliance;
   modifying the request for advertising content based on a user profile listing a plurality of activity types based on information in a payload of the data packets, such that the activity type is based on activities of a user using the first application on the one or more devices, and identifying at least one keyword that can be associated with the activity type and including the keyword in the advertising content profile and incrementing a weighting counter associated with the keyword; and
   transmitting the plurality of data packets including the modified request for advertising content through at least one of a wired network port and a wireless transceiver of the network device to the external network and then to a second application executed by the external computing system configured to respond to the modified request for advertising content.

7. The method of claim 6, wherein modifying the request for advertising content based on the localized advertising content profile includes inserting keywords into the request.

8. The method of claim 7, further including increasing a keyword count for the inserted keywords included in the request.

9. The method of claim 6, further including receiving an advertisement based on the modified request and contemporaneously providing the advertisement to a plurality of devices on the internal network.

10. The method of claim 6, further including modifying the request for advertising content to request a multi-device advertisement based on identification on contemporaneous use of multiple devices on the internal network.

* * * * *